US008862270B2

(12) United States Patent
Okazaki et al.

(10) Patent No.: US 8,862,270 B2
(45) Date of Patent: Oct. 14, 2014

(54) CONTROL APPARATUS, CONTROL METHOD, AND CONTROL PROGRAM FOR PNEUMATIC ARTIFICIAL MUSCLE DRIVE MECHANISM

(71) Applicant: Panasonic Corporation, Osaka (JP)

(72) Inventors: Yasunao Okazaki, Shiga (JP); Masaki Yamamoto, Nara (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/954,197

(22) Filed: Jul. 30, 2013

(65) Prior Publication Data

US 2013/0317647 A1 Nov. 28, 2013

Related U.S. Application Data

(63) Continuation of application No. PCT/JP2012/004828, filed on Jul. 30, 2012.

(30) Foreign Application Priority Data

Aug. 12, 2011 (JP) ................................. 2011-176931

(51) Int. Cl.
| | |
|---|---|
| *B25J 9/16* | (2006.01) |
| *B25J 9/10* | (2006.01) |
| *F15B 21/08* | (2006.01) |
| *B25J 9/14* | (2006.01) |
| *G05B 13/04* | (2006.01) |
| *G05B 19/04* | (2006.01) |

(52) U.S. Cl.
CPC ................. *B25J 9/163* (2013.01); *B25J 9/1075* (2013.01); *F15B 21/087* (2013.01); *B25J 9/142* (2013.01); *G05B 13/04* (2013.01); *Y01S 901/22* (2013.01); *G05B 2219/39462* (2013.01)
USPC ............................................. 700/250; 700/1

(58) Field of Classification Search
CPC ........ B25J 9/161; B25J 9/1661; B25J 9/1666; B25J 9/1664
See application file for complete search history.

(56) References Cited

U.S. PATENT DOCUMENTS 5,648,709 A * 7/1997 Maeda ..................... 318/568.17
(Continued)

FOREIGN PATENT DOCUMENTS

| | | |
|---|---|---|
| JP | 4-81711 | 3/1992 |
| JP | 2000-95107 | 4/2000 |
| JP | 2007-304767 | 11/2007 |
| JP | 2010-221399 | 10/2010 |

(Continued)

OTHER PUBLICATIONS

International Preliminary Report on Patentability and Written Opinion of the International Searching Authority issued Feb. 27, 2014 in International (PCT) Application No. PCT/JP2012/004828.

(Continued)

*Primary Examiner* — Ian Jen
(74) *Attorney, Agent, or Firm* — Wenderoth, Lind & Ponack, LLP.

(57) ABSTRACT

There is provided a control apparatus for a drive mechanism driven by a pneumatic artificial muscle, the control apparatus including a pressure controller that controls pressure of the pneumatic artificial muscle, a desired pressure calculator that calculates, based on a pneumatic artificial muscle model, a desired pressure of the pneumatic artificial muscle in order to control motion of the drive mechanism, a pneumatic artificial muscle model error estimator that estimates aging variation in a contraction percentage error between the pneumatic artificial muscle and the pneumatic artificial muscle model, a pneumatic artificial muscle model updater that updates the pneumatic artificial muscle model so as to reflect the aging variation based on an estimation result of the pneumatic artificial muscle model error estimator, and a lifetime predictor that predicts a lifetime of the pneumatic artificial muscle based on the estimation result of the pneumatic artificial muscle model error estimator.

11 Claims, 12 Drawing Sheets

(56) References Cited

U.S. PATENT DOCUMENTS

| | | | |
|---|---|---|---|
| 8,253,367 B2 | 8/2012 | Komatsu et al. | |
| 2010/0114329 A1* | 5/2010 | Casler et al. | 623/24 |
| 2011/0054870 A1* | 3/2011 | Dariush et al. | 703/11 |
| 2011/0078508 A1 | 3/2011 | Komatsu et al. | |
| 2011/0082566 A1* | 4/2011 | Herr et al. | 623/24 |
| 2013/0317647 A1* | 11/2013 | Okazaki et al. | 700/250 |

FOREIGN PATENT DOCUMENTS

| | | |
|---|---|---|
| WO | 2010/082452 | 7/2010 |
| WO | 2011/086638 | 7/2011 |

OTHER PUBLICATIONS

International Search Report issued Oct. 30, 2012 in International (PCT) Application No. PCT/JP2012/004828.

* cited by examiner

CONTROL APPARATUS, CONTROL METHOD, AND CONTROL PROGRAM FOR PNEUMATIC ARTIFICIAL MUSCLE DRIVE MECHANISM

CROSS-REFERENCE TO RELATED APPLICATIONS

This is a continuation application of International Application No. PCT/JP2012/004828, with an international filing date of Jul. 30, 2012, which claims priority of Japanese Patent Application No.: 2011-176931 filed on Aug. 12, 2011, the content of which is incorporated herein by reference.

TECHNICAL FIELD

The technical field relates to a control apparatus, a control method, and a computer-readable recording medium including a control program for a pneumatic artificial muscle drive mechanism, which are used for controlling the pneumatic artificial muscle drive mechanism.

BACKGROUND ART

In recent years, domestic robots such as pet robots have been developed extensively. More practical domestic robots such as housekeeping support robots are expected to be implemented in the future. Such a domestic robot is utilized in a home and needs to coexist with a human being. The domestic robot thus inevitably comes into physical contact with the human being and needs to be flexible in terms of safety.

In plants, automation has been progressing in assembling work or dismantlement work for recycling. Conventional industrial robots are hardly useful if the work is complicated or the environment is not simple in which tools such as jigs are hard to be used and components are placed at different positions in small lot production in great varieties or the like. To the contrary, there have been proposed work support robots that assist mainly working of human beings so as to improve work efficiency. Such a robot assisting a human being operates near the human being, and thus needs to be flexible in terms of safety.

As a flexible robot, there has been developed a pneumatic arm that is driven by a pneumatic artificial muscle as a pneumatic actuator. The pneumatic arm utilizing air compressibility has mechanical flexibility and is essentially safe in comparison to a case of performing control so as to realize flexibility.

The pneumatic artificial muscle is configured by an elastic body and thus has a problem of large aging variation due to contraction or a load.

In order that a control system deals with such aging variation of an actuator in a mechanism driven by the actuator, JP 2000-95107 A proposes a conventional technique in which a damping apparatus for reducing vibration of a vehicle supported by a bogie truck with use of a hydraulic actuator improves damping performance by identification of an actuator motion model.

SUMMARY OF THE INVENTION

It is, however, difficult to directly apply the configuration disclosed in JP 2000-95107 A to a pneumatic artificial muscle. Furthermore, due to strong nonlinearity of the pneumatic artificial muscle, it is not easy to estimate its property variation such as aging variation, and real time estimation is thus difficult, which is required for control.

In view of the above problems of the conventional technique, one non-limiting and exemplary embodiment provides a control apparatus, a control method, and a computer-readable recording medium including a control program for a pneumatic artificial muscle drive mechanism, which cause less deterioration in control performance due to aging variation of a pneumatic artificial muscle.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

In order to achieve the above object, the present invention proposes the following configurations.

In one general aspect, the techniques disclosed here feature: a control apparatus for a pneumatic artificial muscle drive mechanism driven by a pneumatic artificial muscle, the control apparatus comprising:

a desired pressure calculator that calculates, based on a pneumatic artificial muscle model, a desired pressure of the pneumatic artificial muscle in order to control motion of the drive mechanism;

a pneumatic artificial muscle model error estimator that estimates aging variation in a contraction percentage error between the pneumatic artificial muscle and the pneumatic artificial muscle model;

a pressure controller that controls pressure of the pneumatic artificial muscle based on information from the desired pressure calculator or information from the pneumatic artificial muscle model error estimator; and a pneumatic artificial muscle model updater that updates the pneumatic artificial muscle model so as to reflect the aging variation based on an estimation result of the pneumatic artificial muscle model error estimator.

These general and specific aspects can be realized with use of a system, a method, a computer-readable recording medium including a computer program, a recording medium that stores a program and can be read by a computer, or any combination of any of the system, the method, the computer-readable recording medium including the computer program, and the recording medium that stores a program and can be read by a computer.

According to the aspects of the present invention, the pneumatic artificial muscle model error estimator estimates contraction of the pneumatic artificial muscle due to aging variation and the pneumatic artificial muscle model updater updates the pneumatic artificial muscle model, so that the pneumatic artificial muscle model reflects the aging variation and is thus improved in accuracy thereof. Such a configuration realizes the control apparatus, the control method, and the computer-readable recording medium including the control program for the pneumatic artificial muscle drive mechanism, which cause less deterioration in control accuracy due to aging variation even after use for a long period of time.

Furthermore, the lifetime predictor, which is optionally provided and monitors a contraction trend, is capable of predicting damage on the pneumatic artificial muscle on the basis of variation from an increasing trend to a decreasing trend, for example.

Moreover, on the basis of prediction of the lifetime by the lifetime predictor, the lifetime alarm outputs a damage alarm for the pneumatic artificial muscle. For example, if the pressure controller is configured to stop motion of the pneumatic artificial muscle, it is possible to provide the control apparatus, the control method, and the computer-readable recording medium including the control program for the pneumatic artificial muscle drive mechanism, which are capable of safely stopping the pneumatic artificial muscle before the pneumatic artificial muscle is damaged due to aging variation.

BRIEF DESCRIPTION OF THE DRAWINGS

These and other aspects and features of the present disclosure will be apparent from the following description related to embodiments taken in conjunction with the accompanying drawings, in which.

DETAILED DESCRIPTION

Figure 1:
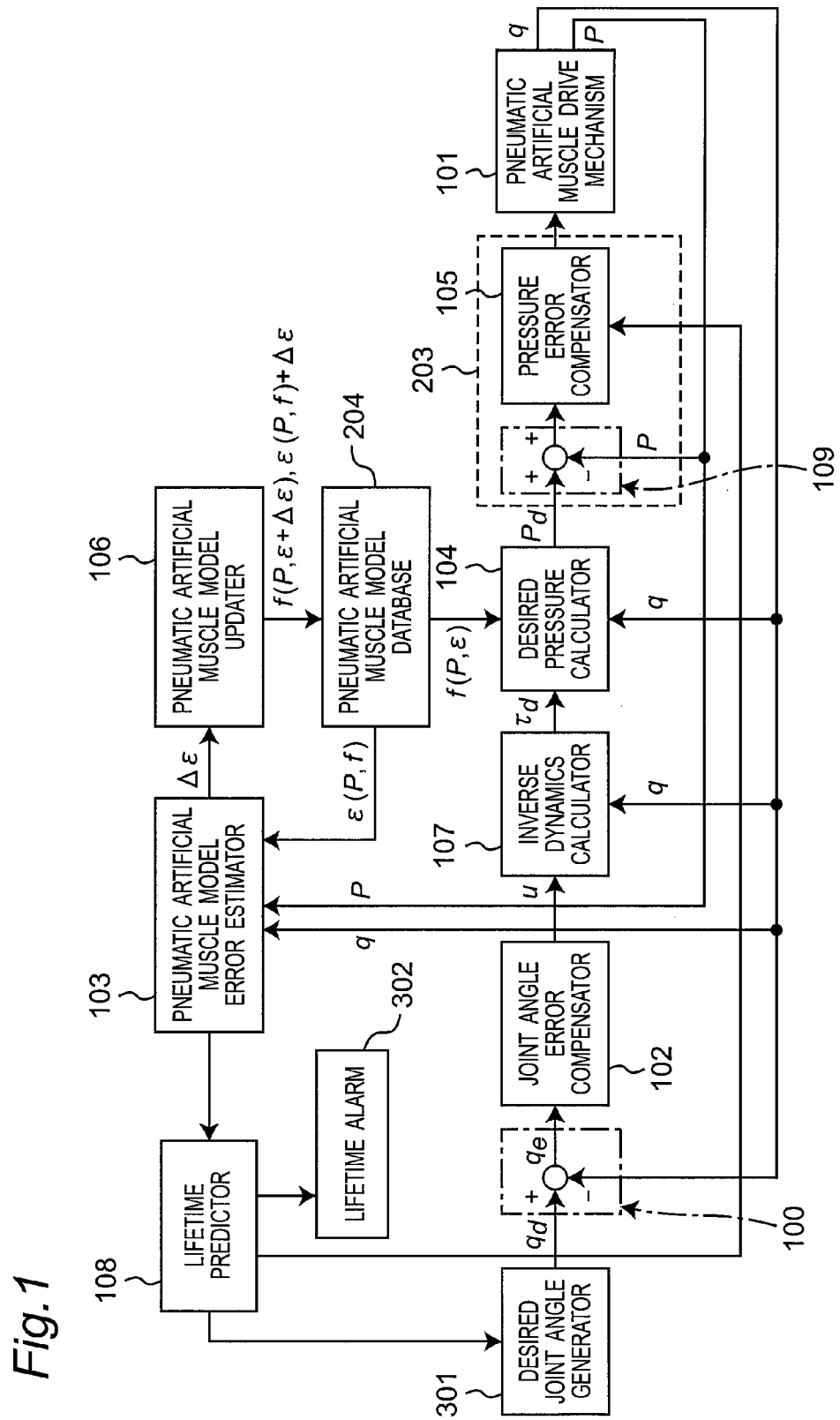
FIG. 1 is a block diagram showing a configuration of a control apparatus for a pneumatic artificial muscle drive mechanism according to a first embodiment of the present invention.

Before detailing the embodiments of the present invention with reference to the accompanying drawings, reference is made to various aspects of the present invention.

Examples of the disclosed technique are as follows.

First aspect: A control apparatus for a pneumatic artificial muscle drive mechanism driven by a pneumatic artificial muscle, the control apparatus comprising:

a desired pressure calculator that calculates, based on a pneumatic artificial muscle model, a desired pressure of the pneumatic artificial muscle in order to control motion of the drive mechanism;

a pneumatic artificial muscle model error estimator that estimates aging variation in a contraction percentage error between the pneumatic artificial muscle and the pneumatic artificial muscle model;

a pressure controller that controls pressure of the pneumatic artificial muscle based on information from the desired pressure calculator or information from the pneumatic artificial muscle model error estimator; and a pneumatic artificial muscle model updater that updates the pneumatic artificial muscle model so as to reflect the aging variation based on an estimation result of the pneumatic artificial muscle model error estimator.

According to the above aspect, the pneumatic artificial muscle model error estimator estimates contraction of the pneumatic artificial muscle due to aging variation and the pneumatic artificial muscle model updater updates the pneumatic artificial muscle model, so that the pneumatic artificial muscle model reflects the aging variation and is thus improved in accuracy thereof. Such a configuration realizes the control apparatus for the pneumatic artificial muscle drive mechanism, which causes less deterioration in control accuracy due to aging variation even after use for a long period of time.

Second aspect: The control apparatus for the pneumatic artificial muscle drive mechanism according to the first aspect, further comprising a lifetime predictor that predicts a lifetime of the pneumatic artificial muscle based on the estimation result of the pneumatic artificial muscle model error estimator.

According to the above aspect, the lifetime predictor is provided and monitors a contraction trend, so as to be capable of predicting damage on the pneumatic artificial muscle on the basis of variation from an increasing trend to a decreasing trend, for example.

Third aspect: A control apparatus for a pneumatic artificial muscle drive mechanism driven by a pneumatic artificial muscle, the control apparatus comprising:

a desired pressure calculator that calculates, based on a pneumatic artificial muscle model, a desired pressure of the pneumatic artificial muscle in order to control motion of the drive mechanism;

a pneumatic artificial muscle model error estimator that estimates aging variation in a contraction percentage error between the pneumatic artificial muscle and the pneumatic artificial muscle model;

a pressure controller that controls pressure of the pneumatic artificial muscle based on information from the desired pressure calculator or information from the pneumatic artificial muscle model error estimator; and a lifetime predictor that predicts a lifetime of the pneumatic artificial muscle based on an estimation result of the pneumatic artificial muscle model error estimator.

According to the above aspect, the lifetime predictor is provided and monitors a contraction trend, so as to be capable of predicting damage on the pneumatic artificial muscle on the basis of variation from an increasing trend to a decreasing trend, for example.

Fourth aspect: The control apparatus for the pneumatic artificial muscle drive mechanism according to the second aspect, further comprising:

a lifetime alarm that outputs a damage alarm for the pneumatic artificial muscle;

wherein the lifetime predictor causes the lifetime alarm to output the damage alarm for the pneumatic artificial muscle after aging variation in the contraction percentage error of the pneumatic artificial muscle changes from an increasing trend to a decreasing trend.

According to the above aspect, on the basis of prediction of the lifetime by the lifetime predictor, the lifetime alarm outputs a damage alarm for the pneumatic artificial muscle. The pressure controller is thus capable of stopping motion of the pneumatic artificial muscle, for example. It is thus possible to provide the control apparatus for the pneumatic artificial muscle drive mechanism, which safely stops the pneumatic artificial muscle before the pneumatic artificial muscle is damaged due to aging variation.

Fifth aspect: The control apparatus for the pneumatic artificial muscle drive mechanism according to the second aspect, further comprising:

a lifetime alarm that outputs a damage alarm for the pneumatic artificial muscle;

wherein the lifetime predictor causes the lifetime alarm to output the damage alarm for the pneumatic artificial muscle when an aging variation amount of the contraction percentage error exceeds a limit contraction percentage error of the pneumatic artificial muscle set in correspondence with application of a force applied on the pneumatic artificial muscle.

According to the above aspect, on the basis of prediction of the lifetime by the lifetime predictor, the lifetime alarm outputs a damage alarm for the pneumatic artificial muscle. The pressure controller is thus capable of stopping motion of the pneumatic artificial muscle, for example. It is thus possible to provide the control apparatus for the pneumatic artificial muscle drive mechanism, which safely stops the pneumatic artificial muscle before the pneumatic artificial muscle is damaged due to aging variation.

Sixth aspect: The control apparatus for the pneumatic artificial muscle drive mechanism according to the first or third aspect, wherein the pneumatic artificial muscle model updater updates such that a property value of the pneumatic artificial muscle model parallelly shifts by an aging variation amount of the contraction percentage error estimated by the pneumatic artificial muscle model error estimator.

According to the above aspect, even when the pneumatic artificial muscle has strong nonlinearity and a control system is hard to estimate the error of the property model, the error of the property model can be estimated approximately.

Seventh aspect: The control apparatus for the pneumatic artificial muscle drive mechanism according to the first or third aspect, wherein the pneumatic artificial muscle model updater updates such that a property value of the pneumatic artificial muscle model linearly transforms by an aging variation amount of the contraction percentage error estimated by the pneumatic artificial muscle model error estimator.

According to the above aspect, even when the pneumatic artificial muscle has strong nonlinearity and a control system is hard to estimate the error of the property model, the error of the property model can be estimated approximately.

Eighth aspect: The control apparatus for the pneumatic artificial muscle drive mechanism according to the first or third aspect, wherein the pneumatic artificial muscle model updater updates such that a property value of the pneumatic artificial muscle model affine-transforms by an aging variation amount of the contraction percentage error estimated by the pneumatic artificial muscle model error estimator.

According to the above aspect, even when the pneumatic artificial muscle has strong nonlinearity and a control system is hard to estimate the error of the property model, the error of the property model can be estimated approximately.

Ninth aspect: The control apparatus for the pneumatic artificial muscle drive mechanism according to the first or third aspect, wherein the pneumatic artificial muscle model updater updates such that a property value of the pneumatic artificial muscle model transforms in accordance with a polynomial by an aging variation amount of the contraction percentage error estimated by the pneumatic artificial muscle model error estimator.

According to the above aspect, even when the pneumatic artificial muscle has strong nonlinearity and a control system is hard to estimate the error of the property model, the error of the property model can be estimated approximately.

Tenth aspect: A method of controlling a pneumatic artificial muscle drive mechanism driven by a pneumatic artificial muscle, the method comprising:

calculating at a desired pressure calculator, based on a pneumatic artificial muscle model, a desired pressure of the pneumatic artificial muscle in order to control motion of the drive mechanism;

estimating at a pneumatic artificial muscle model error estimator, aging variation in a contraction percentage error between the pneumatic artificial muscle and the pneumatic artificial muscle model;

controlling at a pressure controller, pressure of the pneumatic artificial muscle based on information from the desired pressure calculator or information from the pneumatic artificial muscle model error estimator; and updating at a pneumatic artificial muscle model updater, the pneumatic artificial muscle model so as to reflect the aging variation based on an estimation result of the pneumatic artificial muscle model error estimator.

According to the above aspect, the pneumatic artificial muscle model error estimator estimates contraction of the pneumatic artificial muscle due to aging variation and the pneumatic artificial muscle model updater updates the pneumatic artificial muscle model, so that the pneumatic artificial muscle model reflects the aging variation and is thus improved in accuracy thereof. Such a configuration realizes the control method for the pneumatic artificial muscle drive mechanism, which causes less deterioration in control accuracy due to aging variation even after use for a long period of time.

Eleventh aspect: The method of controlling the pneumatic artificial muscle drive mechanism according to the tenth aspect, further comprising: predicting at a lifetime predictor, a lifetime of the pneumatic artificial muscle based on the estimation result of the pneumatic artificial muscle model error estimator.

According to the above aspect, the lifetime predictor predicts the lifetime of the pneumatic artificial muscle. The lifetime predictor monitors a contraction trend so as to be capable of predicting damage on the pneumatic artificial muscle on the basis of variation from an increasing trend to a decreasing trend, for example.

Twelfth aspect: A method of controlling a pneumatic artificial muscle drive mechanism driven by a pneumatic artificial muscle, the method comprising:

calculating at a desired pressure calculator, based on a pneumatic artificial muscle model, a desired pressure of the pneumatic artificial muscle in order to control motion of the drive mechanism;

estimating at a pneumatic artificial muscle model error estimator, aging variation in a contraction percentage error between the pneumatic artificial muscle and the pneumatic artificial muscle model;

controlling at a pressure controller, pressure of the pneumatic artificial muscle based on information from the desired pressure calculator or information from the pneumatic artificial muscle model error estimator; and predicting at a lifetime predictor, a lifetime of the pneumatic artificial muscle based on an estimation result of the pneumatic artificial muscle model error estimator.

According to the above aspect, the lifetime predictor predicts the lifetime of the pneumatic artificial muscle. The lifetime predictor monitors a contraction trend so as to be capable of predicting damage on the pneumatic artificial muscle on the basis of variation from an increasing trend to a decreasing trend, for example.

Thirteenth aspect: A computer-readable recording medium including a control program for a pneumatic artificial muscle drive mechanism driven by a pneumatic artificial muscle, the control program causing a computer to function as:

a desired pressure calculator that calculates, based on a pneumatic artificial muscle model, a desired pressure of the pneumatic artificial muscle in order to control motion of the drive mechanism;

a pneumatic artificial muscle model error estimator that estimates aging variation in a contraction percentage error between the pneumatic artificial muscle and the pneumatic artificial muscle model;

a pressure controller that controls pressure of the pneumatic artificial muscle based on information from the desired pressure calculator or information from the pneumatic artificial muscle model error estimator; and a pneumatic artificial muscle model updater that updates the pneumatic artificial muscle model so as to reflect the aging variation based on an estimation result of the pneumatic artificial muscle model error estimator.

According to the above aspect, the pneumatic artificial muscle model error estimator estimates contraction of the pneumatic artificial muscle due to aging variation and the pneumatic artificial muscle model updater updates the pneumatic artificial muscle model, so that the pneumatic artificial muscle model reflects the aging variation and is thus improved in accuracy thereof. Such a configuration realizes the computer-readable recording medium including the control program for the pneumatic artificial muscle drive mechanism, which causes less deterioration in control accuracy due to aging variation even after use for a long period of time.

Fourteenth aspect: The computer-readable recording medium including the control program for the pneumatic artificial muscle drive mechanism according to the thirteenth aspect, the control program further causing the computer to function as a lifetime predictor that predicts a lifetime of the pneumatic artificial muscle based on the estimation result of the pneumatic artificial muscle model error estimator.

According to the above aspect, the lifetime predictor is provided and monitors a contraction trend, so as to be capable of predicting damage on the pneumatic artificial muscle on the basis of variation from an increasing trend to a decreasing trend, for example.

Fifteenth aspect: A computer-readable recording medium including a control program for a pneumatic artificial muscle drive mechanism driven by a pneumatic artificial muscle, the control program causing a computer to function as:

a desired pressure calculator that calculates, based on a pneumatic artificial muscle model, a desired pressure of the pneumatic artificial muscle in order to control motion of the drive mechanism;

a pneumatic artificial muscle model error estimator that estimates aging variation in a contraction percentage error between the pneumatic artificial muscle and the pneumatic artificial muscle model;

a pressure controller that controls pressure of the pneumatic artificial muscle based on information from the desired pressure calculator or information from the pneumatic artificial muscle model error estimator; and a lifetime predictor that predicts a lifetime of the pneumatic artificial muscle based on an estimation result of the pneumatic artificial muscle model error estimator.

According to the above aspect, the lifetime predictor is provided and monitors a contraction trend, so as to be capable of predicting damage on the pneumatic artificial muscle on the basis of variation from an increasing trend to a decreasing trend, for example.

Described in detail below are the embodiments of the present invention with reference to the accompanying drawings.

First Embodiment

Figure 2:
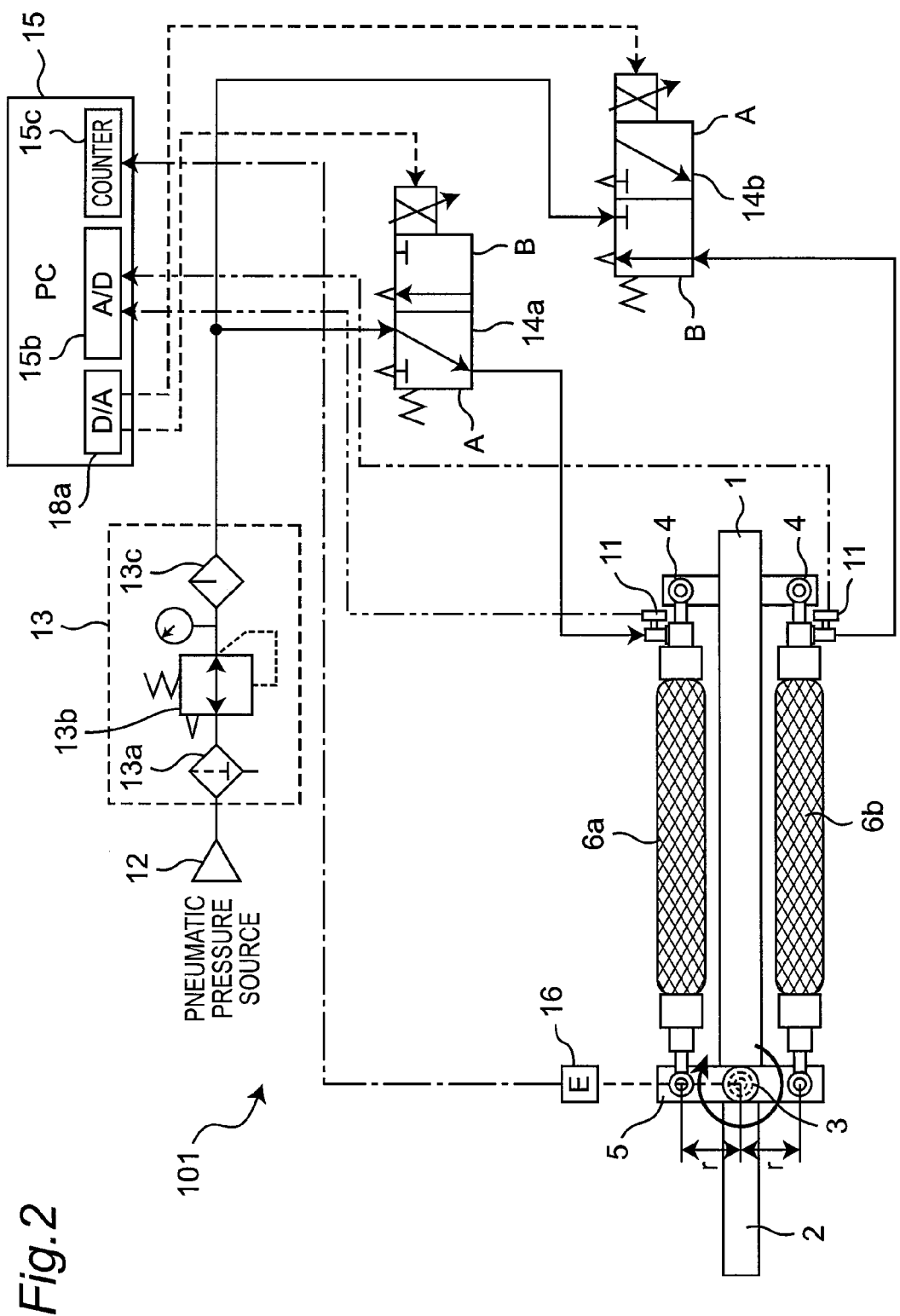
FIG. 2 is a view showing a configuration of the pneumatic artificial muscle drive mechanism according to the first embodiment of the present invention.
Figure 3:
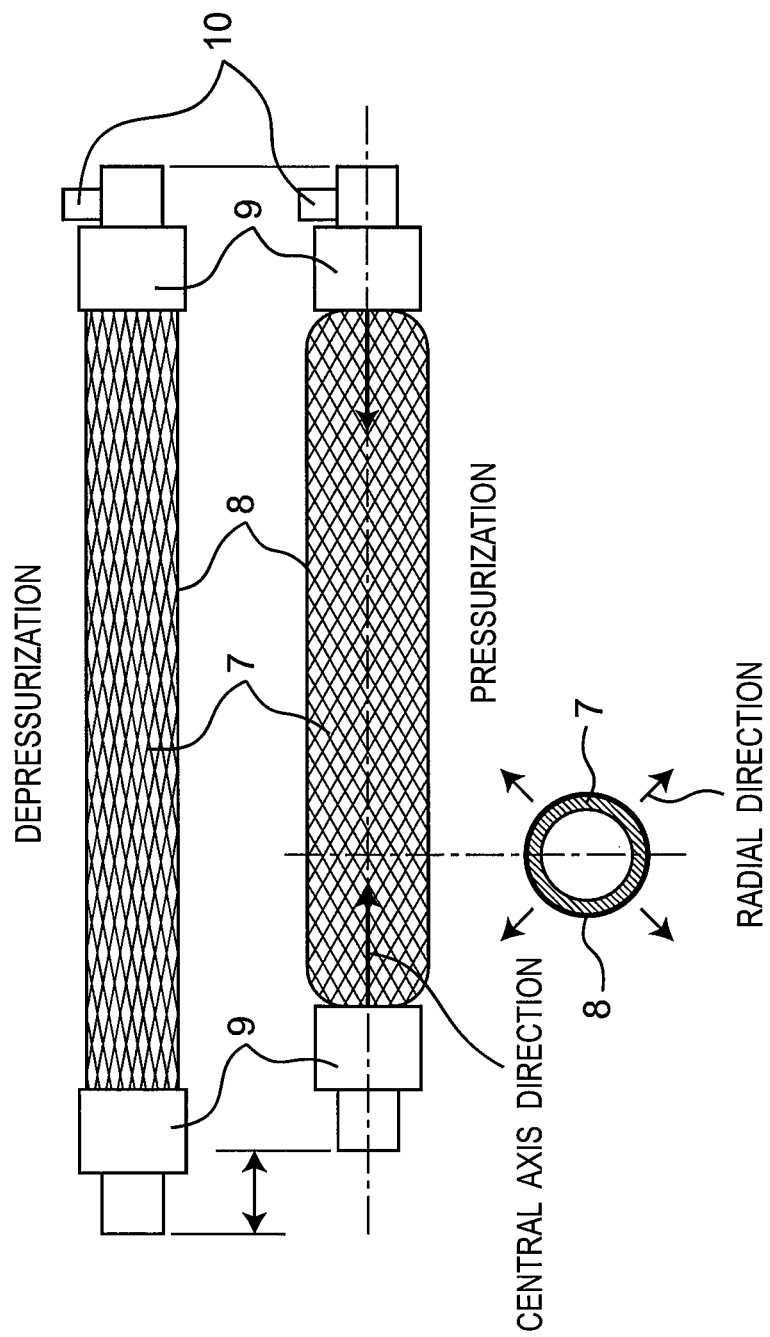
FIG. 3 is a view showing a configuration of a pneumatic artificial muscle.

FIG. 1 is a block diagram showing a configuration of a control apparatus for a pneumatic artificial muscle drive mechanism according to the first embodiment of the present invention. FIG. 2 is a view showing an entire configuration of the pneumatic artificial muscle drive mechanism according to the first embodiment of the present invention. FIG. 3 is a view showing a configuration of a pneumatic artificial muscle as an example of an elastic actuator.

In FIG. 2, a pair of pneumatic artificial muscles 6a and 6b each serving as examples of a pneumatic artificial muscle are disposed substantially in parallel with each other along a bar-shaped first structure 1. First ends of tubular elastic bodies 7 closer to fluid injection/discharge members 10 are fixed to second ends of tubular actuator support members 4 having first ends fixed to an end of the first structure 1, respectively. Second ends of the tubular elastic bodies 7 of the pair of pneumatic artificial muscles 6a and 6b support a tabular actuator driving force transmissive member 5 that is rotatably supported by the first structure 1 by means of a rotary joint 3. The actuator driving force transmissive member 5 rotatably supports the second ends of the tubular elastic bodies 7 of the pair of pneumatic artificial muscles 6a and 6b. Accordingly, as to be mentioned later, when the tubular elastic bodies 7 of the pair of pneumatic artificial muscles 6a and 6b expand and contract (more specifically, one of the tubular elastic bodies 7 expands and the other tubular elastic body 7 contracts), the actuator driving force transmissive member 5 is driven to rotate positively or negatively about the rotary joint 3, and a bar-shaped second structure 2 is driven to rotate positively or negatively about the rotary joint 3. Rotation to the right as indicated by an arrow in FIG. 2 is defined as positive rotation, whereas rotation to the left inversely to the arrow is defined as negative rotation.

As shown in FIG. 3, in each of the pneumatic artificial muscles 6a and 6b, the tubular elastic body 7 made of rubber material is provided on the outer surface thereof with a restraint member 8 configured by weaving, into a net shape, fiber cords made of resin or metal that is hard to expand. The both ends of the tubular elastic body 7 are hermetically sealed by sealing members 9. When a compressible fluid such as air is supplied into the tubular elastic body 7 through the fluid injection/discharge member 10 to apply internal pressure into an interior space of the tubular elastic body 7, the tubular elastic body 7 tends to expand mainly in the radial direction. Such radial expansion is converted to contracting motion along the central axis of the tubular elastic body 7 due to the action of the restraint member 8, and thus, the tubular elastic body 7 contracts in total length. This pneumatic artificial muscle is mainly configured by the elastic body, and is thus flexible, safe, and light in weight.

Described next is a configuration of a pneumatic pressure supply/drive system for driving the pneumatic artificial muscles 6a and 6b. FIG. 2 shows a pneumatic pressure source 12 such as a compressor, a pneumatic pressure adjusting unit 13 that includes a pneumatic pressure filter 13a, a pneumatic pressure reducing valve 13b, and a pneumatic pressure lubricator 13c coupled together. FIG. 2 also shows three-port flow control solenoid valves 14a and 14b each of which drives a spool valve or the like by means of force of an electromagnet to control the flow rate. FIG. 2 further shows a control computer 15, which can be an ordinary personal computer, configuring a control apparatus of a pneumatic artificial muscle drive mechanism 101. The control computer 15 is provided with a D/A board 15a, and transmits voltage command values to the three-port flow control solenoid valves 14a and 14b so as to control the flow rates of air flowing through the fluid injection/discharge members 10. The control computer 15 is also provided with an A/D board 15b, and receives voltage output values from pressure sensors 11 of the pneumatic artificial muscles 6a and 6b so as to measure pressure in each of the pneumatic artificial muscles 6a and 6b. The control computer 15 is further provided with a counter board 15c, and receives a signal from an encoder 16 built in the joint 3 so as to measure an angle of the joint 3.

In the pneumatic pressure supply/drive system shown in FIG. 2, highly pressurized air generated by the pneumatic pressure source 12 is depressurized and adjusted to constant pressure such as 600 kPa by the pneumatic pressure adjusting unit 13. The constant pressure thus obtained is supplied to each of the three-port flow control solenoid valves 14a and 14b. The opening degrees of the three-port flow control solenoid valves 14a and 14b are controlled in proportion to the voltage command values transmitted from the control computer 15 by way of the D/A board 15a. The three-port flow control solenoid valves 14a and 14b are connected with the fluid injection/discharge members 10 of the tubular elastic bodies 7 of the pair of pneumatic artificial muscles 6a and 6b, respectively.

When the control computer 15 causes the D/A board 15a to transmit a positive voltage command value to the three-port flow control solenoid valve 14a and transmit a negative voltage command value to the three-port flow control solenoid valve 14b, as shown in FIG. 2, the three-port flow control solenoid valve 14a is brought into a state indicated by a pneumatic circuit symbol A (state A) and the three-port flow control solenoid valve 14b is brought into a state indicated by a pneumatic circuit symbol B (state B). Accordingly, the three-port flow control solenoid valve 14a opens a flow passage from the pneumatic pressure source 12 to the fluid injection/discharge member 10 of the tubular elastic body 7 of the pneumatic artificial muscle 6a, and air of the flow rate in proportion to the absolute value of the voltage command value is supplied to the pneumatic artificial muscle 6a. On the other hand, the three-port flow control solenoid valve 14b opens a flow passage from the fluid injection/discharge member 10 of the tubular elastic body 7 of the pneumatic artificial muscle 6b to atmosphere pressure side, and air of the flow rate in proportion to the absolute value of the voltage command value is exhausted from the pneumatic artificial muscle 6b to atmosphere. Accordingly, as shown in FIG. 2, the pneumatic artificial muscle 6a is decreased in total length whereas the pneumatic artificial muscle 6b is increased in total length. The rotary joint 3 thus rotates to the right as indicated by the arrow at the speed in proportion to the absolute value of the voltage command value.

On the other hand, when the control computer 15 causes the D/A board 15a to transmit a negative voltage command value to the three-port flow control solenoid valve 14a and transmit a positive voltage command value to the three-port flow control solenoid valve 14b, the three-port flow control solenoid valve 14a is brought into the state indicated by the pneumatic circuit symbol B and the three-port flow control solenoid valve 14b is brought into the state indicated by the pneumatic circuit symbol A. The pneumatic artificial muscles 6a and 6b thus move inversely and the rotary joint 3 rotates to the left. More specifically, the three-port flow control solenoid valve 14b opens the flow passage from the pneumatic pressure source 12 to the fluid injection/discharge member 10 of the tubular elastic body 7 of the pneumatic artificial muscle 6b, and air of the flow rate in proportion to the absolute value of the voltage command value is supplied to the pneumatic artificial muscle 6b. On the other hand, the three-port flow control solenoid valve 14a opens the flow passage from the fluid injection/discharge member 10 of the tubular elastic body 7 of the pneumatic artificial muscle 6a to atmosphere pressure side, and air of the flow rate in proportion to the absolute value of the voltage command value is exhausted from the pneumatic artificial muscle 6a to the atmosphere. Accordingly, the pneumatic artificial muscle 6b is decreased in total length whereas the pneumatic artificial muscle 6a is increased in total length. The rotary joint 3 thus rotates to the left inversely to the arrow at the speed in proportion to the absolute value of the voltage command value.

FIG. 1 is the block diagram showing the configuration of the control apparatus for the pneumatic artificial muscle drive mechanism 101 according to the first embodiment of the present invention. FIG. 1 shows the pneumatic artificial muscle drive mechanism 101 according to the first embodiment, which is shown in more detail in FIG. 2. The pneumatic artificial muscle drive mechanism 101 outputs current joint angle value q, which is measured by the encoder 16 and internal pressure values $P=[P_a, P_b]^T$ of the pneumatic artificial muscles 6a and 6b, which are measured by the pressure sensors 11. The values $P_a$ and $P_b$ are the internal pressure values of the pneumatic artificial muscles 6a and 6b, respectively.

FIG. 1 shows a desired joint angle generator (desired joint angle generation unit) 301 that outputs a desired joint angle $q_d$ of the rotary joint 3 in the pneumatic artificial muscle drive mechanism 101.

FIG. 1 also shows a joint angle error compensator (joint angle error compensation unit) 102. A first operation unit 100 obtains an error $q_e$ between the current joint angle value q and a desired joint angle (Id from the current joint angle value q measured in the pneumatic artificial muscle drive mechanism 101. The joint angle error compensator 102 receives the error $q_e$ from the first operation unit 100 and outputs a joint angle error correction output value u.

FIG. 1 further shows an inverse dynamics calculator (inverse dynamics calculation unit) 107 that calculates joint error correction torque $\tau_d$ for correcting the joint angle error $q_e$ in accordance with an equation based on an equation of motion for the pneumatic artificial muscle drive mechanism 101, as in the following equation (1). The inverse dynamics calculator 107 outputs the torque $\tau_d$ thus calculated.

$$Iu = \tau_d \quad (1)$$

In this equation, symbol I indicates the moment of inertia of the second structure 2 about the joint axis of the rotary joint 3.

FIG. 1 further shows a desired pressure calculator (desired pressure calculation unit) 104 that calculates desired pressure values $P_d=[P_{ad}, P_{bd}]^T$ of the pneumatic artificial muscles 6a and 6b necessary for achieving the desired torque $\tau_d$ with use of a pneumatic artificial muscle model. The values $P_{ad}$ and $P_{bd}$ are the desired internal pressure values of the pneumatic artificial muscles 6a and 6b, respectively.

When desired contractive force values of the pneumatic artificial muscles 6a and 6b are denoted by $F_{ad}$ and $F_{bd}$, respectively, the relationship between these values and the desired joint torque $\tau_d$ can approximate to the following equation (2).

$$\tau_d = (F_{ad} \cos q - F_{bd} \cos q) r \quad (2)$$

In this equation, symbol r indicates a distance from the joint axis of the rotary joint 3 to support points of the pneumatic artificial muscles 6a and 6b, as indicated in FIG. 2.

The desired contractive force values $F_{ad}$ and $F_{bd}$ are obtained by the following equations (3) and (4).

$$F_{ad} = F_I + \Delta F_d \quad (3)$$

$$F_{bd} = F_I - \Delta F_d \quad (4)$$

In these equations, symbol $F_I$ indicates an internal force value of the pneumatic artificial muscles 6a and 6b pulling each other, and the internal force value is constant herein. The following equation (5) is obtained from the equations (2) to (4)

$$\Delta F_d = \frac{\tau_d}{2r\cos q} \quad (5)$$

Figure 5:
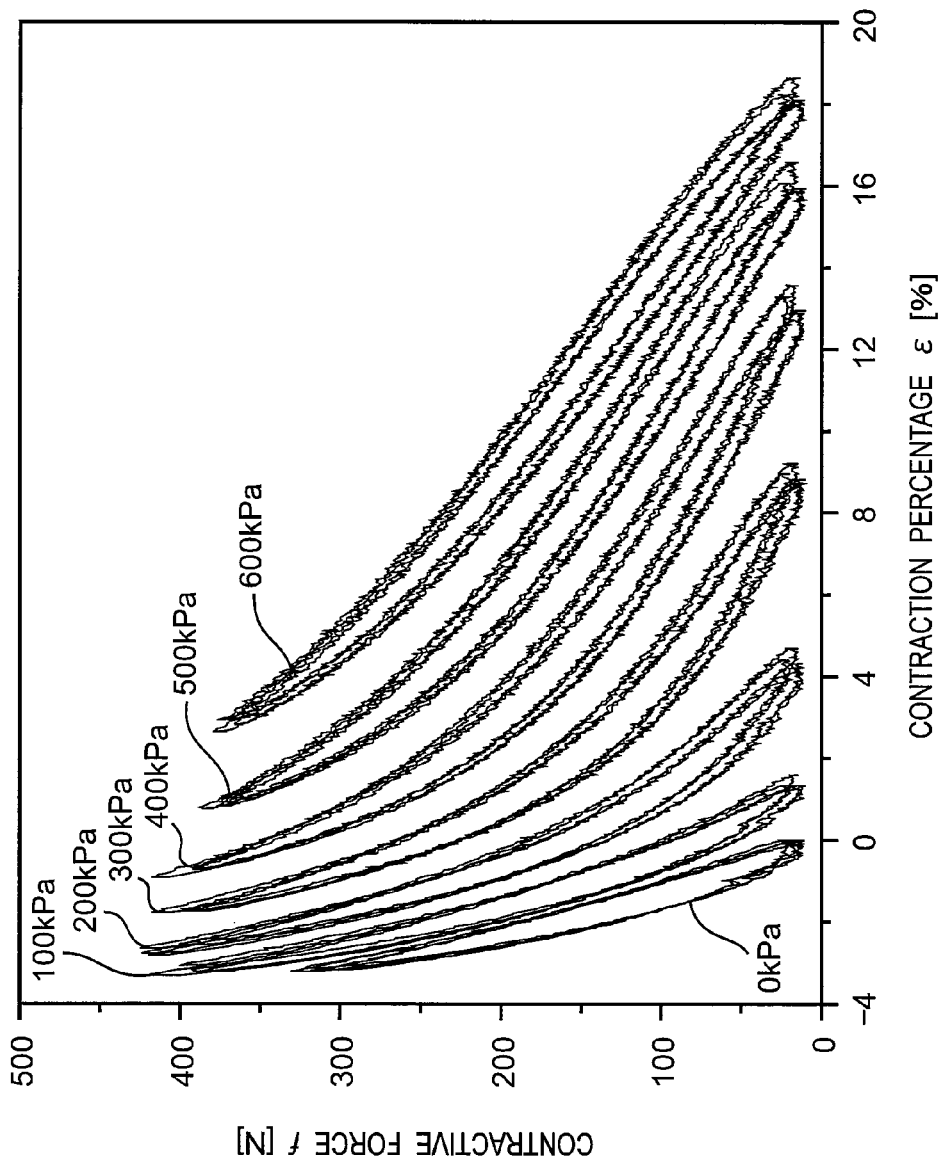
FIG. 5 is a graph indicating measurement results on properties of the pneumatic artificial muscle.

The pneumatic artificial muscle model is built on the basis of results of a test for measuring properties of a pneumatic artificial muscle. FIG. 5 shoes one example of measurement results on properties of a pneumatic artificial muscle having an inner diameter of 10 mm and a length of 279 mm.

From the measurement results indicated in FIG. 5, assuming that contractive force $f(P_i, \epsilon)$ is equal to the average value between an output value in the contraction direction of hysteresis and an output value in the expansion direction thereof, the desired pressure calculator 104 expresses the relationship among the contractive force $f(P_i, \epsilon)$, the contraction percentage $\epsilon$, and pressure $P_i$ in the following cubic polynomial on the contraction percentage $\epsilon$. In this equation, i>0 is established. Furthermore, symbols $a_0$, $a_1$, $a_2$, and $a_3$ indicate coefficients.

$$f = (P_i, \epsilon) = a_0(P_i) + a_1(P_i)\epsilon + a_2(P_i)\epsilon^2 + a_3(P_i)\epsilon^3 \quad (6)$$

Thereafter, by adopting linear interpolation, the contractive force of the pneumatic artificial muscle is expressed by the following equation (7).

$$f(P, \varepsilon) = \frac{(P_{i+1} - P)f(P_i, \varepsilon) + (P - P_i)f(P_{i+1}, \varepsilon)}{P_{i+1} - P_i} \quad (7)$$

In this equation, $P_i < P < P_{i+1}$ is established. In accordance with the above equations (6) and (7) on the pneumatic artificial muscle model, the desired pressure calculator 104 is capable of calculating the contractive force $f(P, \epsilon)$ of the pneumatic artificial muscle from pressure P and the contraction percentage $\epsilon$ geometrically calculated from the joint angle q.

Figure 6:
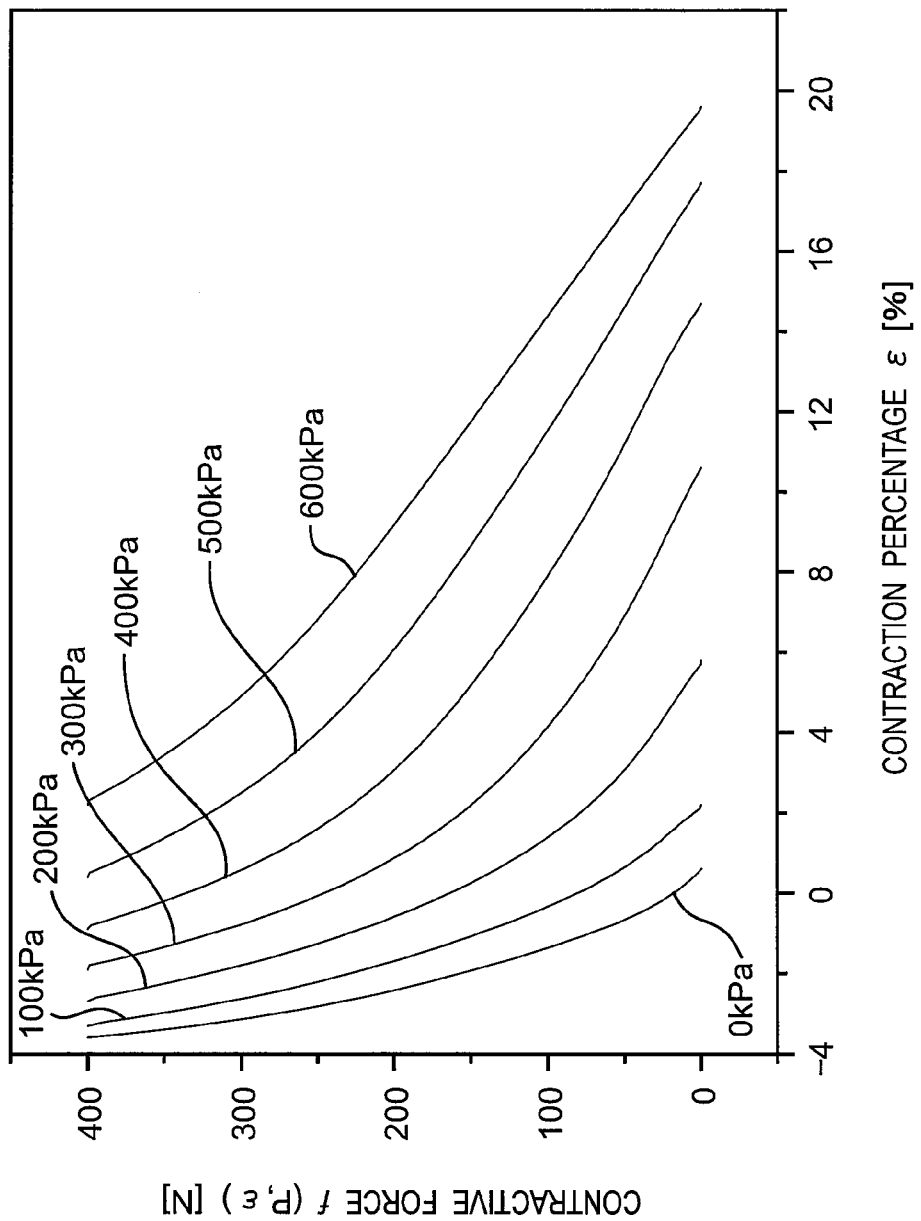
FIG. 6 is a graph indicating calculation results on a pneumatic artificial muscle model.

For example, coefficients $a_0(P_i)$, $a_1(P_i)$, $a_2(P_i)$, and $a_3(P_i)$ are obtained from the measurement results on the properties of the pneumatic artificial muscle as indicated in FIG. 5, and the desired pressure calculator 104 calculates contractive force $f(P, \epsilon)$ in accordance with the equations (6) and (7). FIG. 6 indicates calculation results thereof.

On the basis of the equation (7), the desired pressure calculator 104 is capable of calculating desired pressure $P_d$ in accordance with the following equation (8) in a case where desired contractive force of the pneumatic artificial muscle is expressed as $f_d$.

$$P_d = \frac{(P_{i+1} - P_i)f_d - P_{i+1}f(P_i, \varepsilon) + P_i f(P_{i+1}, \varepsilon)}{f(P_i, \varepsilon) - f(P_{i+1}, \varepsilon)} \quad (8)$$

In this case, the desired pressure calculator 104 searches for values $P_i$ and $P_{i+1}$ that satisfy $f(P_i, \epsilon) < f_d < f(P_{i+1}, \epsilon)$.

Upon receipt of the desired torque $\tau_d$, the desired pressure calculator 104 calculates $\Delta F_d$ in accordance with the equation (5), and also calculates the desired contractive force values $F_{ad}$ and $F_{bd}$ of the pneumatic artificial muscles 6a and 6b in accordance with the equations (3) and (4). When the equation (8) respectively substitutes these values $F_{ad}$ and $F_{bd}$ for $f_d$, the desired pressure calculator 104 calculates desired pressure $P_d = [P_{ad}, P_{bd}]^T$. The value $\Delta F_d$ is defined by the equation (5) such that $\Delta F_d = (F_{ad} - F_{bd})/2$. In other words, the force value $\Delta F_d$ is obtained by halving the difference between pulling force values of the pneumatic artificial muscles 6a and 6b. The desired torque $\tau_d$ is generated from force being twice the force value $\Delta F_d$.

There is provided a pressure controller (pressure control unit) 203 that controls current pressure P so as to reach the desired pressure $P_d$.

The pressure controller 203 includes a pressure error compensator (pressure error compensation unit) 105. A second operation unit 109 subtracts the current pressure P from the desired pressure $P_d$ transmitted from the desired pressure calculator 104 to obtain a pressure error $P_e$. Subsequently, the pressure error compensator 105 calculates a pressure error correction output value from the pressure error $P_e$. The value thus obtained is transmitted, as voltage command values, to the three-port flow control solenoid valves 14a and 14b by way of the D/A board 15a. Accordingly, the rotary joint 3 is driven to move the pneumatic artificial muscle drive mechanism 101.

The first embodiment is characterized by inclusion of, in addition to the basic configuration of the control system having been described, a pneumatic artificial muscle model error estimator (pneumatic artificial muscle model error estimation unit) 103, a pneumatic artificial muscle model updater (pneumatic artificial muscle model updating unit) 106, and a lifetime predictor (lifetime prediction unit) 108.

Figure 7:
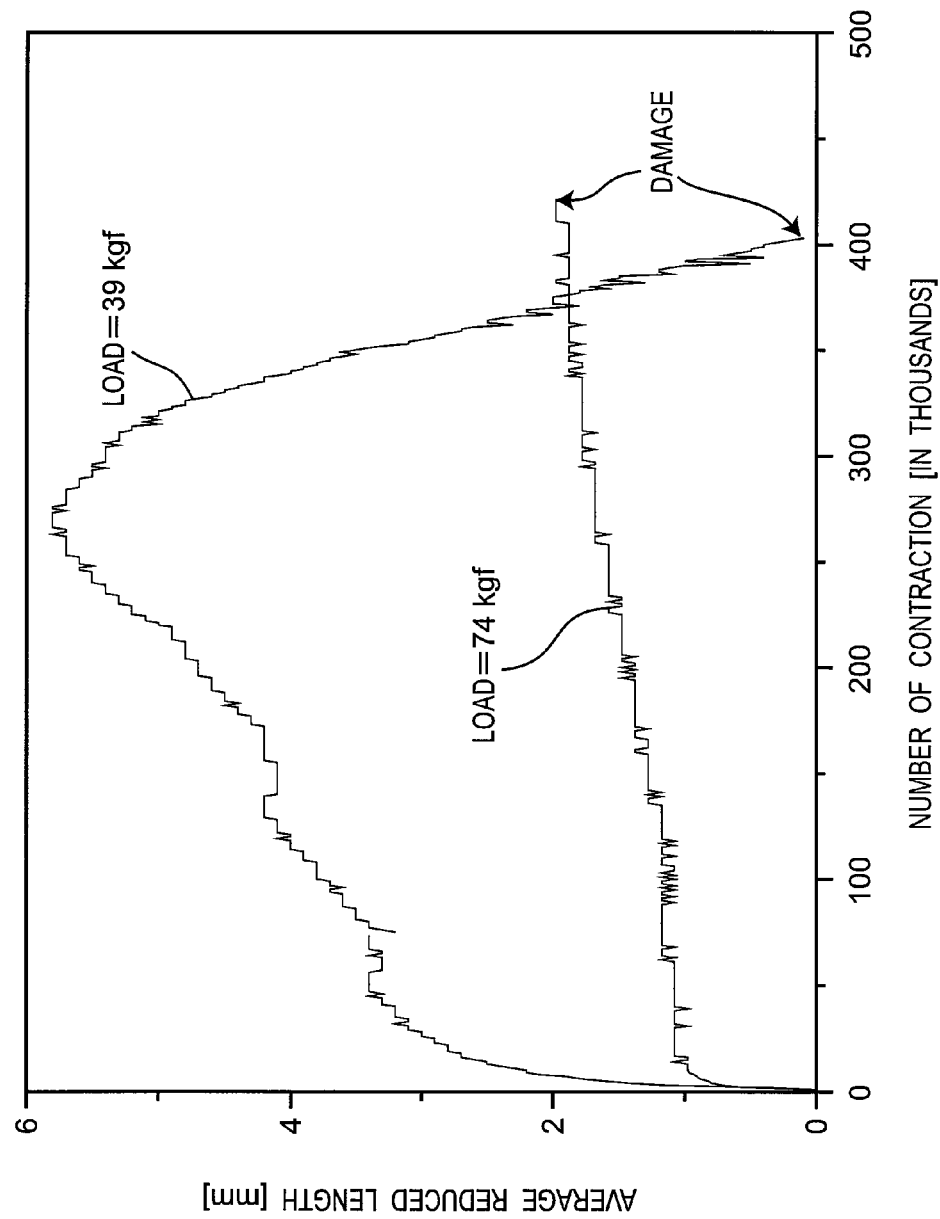
FIG. 7 is a graph indicating test results of a lifetime of the pneumatic artificial muscle.
Figure 9:
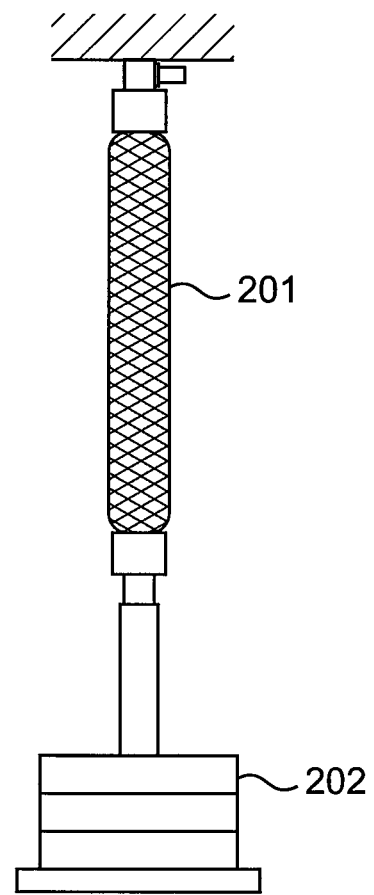
FIG. 9 is a view showing the state of the test of FIG. 7.

In order to describe the principle according to the first embodiment, FIG. 7 indicates test results on a lifetime of a pneumatic artificial muscle. The test results indicated in FIG. 7 are obtained in a case where, as shown in FIG. 9, a pneumatic artificial muscle 201 has a first end being fixed and a second end from which a weight 202 is suspended as a load so as to continuously vary pressure sinusoidally.

In FIG. 7, the transverse axis indicates the number of contraction of the pneumatic artificial muscle and the ordinate axis indicates the average reduced length of the pneumatic artificial muscle. As indicated in FIG. 7, the test proves that the pneumatic artificial muscle dominantly has aging variation in the contraction direction in accordance with the number of contraction. In this manner, upon controlling in accordance with the pneumatic artificial muscle model, the pneumatic artificial muscle causes an error due to such aging variation, thereby leading to deterioration in control performance.

As the number of contraction of the pneumatic artificial muscle further increases, small cracks are generated in the surface of the pneumatic artificial muscle and air slightly leaks out of the cracks, so that the pneumatic artificial muscle having been contracting starts expanding. When the cracks grow and the amount of leaking air increases, internal pressure of the pneumatic artificial muscle does not increase sufficiently. As a result, the pneumatic artificial muscle does not move properly and comes into a damaged state.

The first embodiment proposes the following configuration, in order to solve the two problems, namely, that the pneumatic artificial muscle has aging variation in the contraction direction in accordance with the number of contraction and that small cracks are generated in the surface of the pneumatic artificial muscle as the number of contraction of the pneumatic artificial muscle is further increased.

There is provided the pneumatic artificial muscle model error estimator 103 that estimates an error of the pneumatic artificial muscle model in the following processes, from the actually measured value $\epsilon$ of the contraction percentage of the pneumatic artificial muscle calculated by the pneumatic artificial muscle model error estimator 103 from the joint angle q measured by the encoder 16, and an estimated value $\epsilon_{est}$ calculated by the pneumatic artificial muscle model error estimator 103 in accordance with the pneumatic artificial muscle model.

The pneumatic artificial muscle model error estimator 103 calculates contractive force $F=[F_a, F_b]^T$ of the pneumatic artificial muscle in the following manner, from the joint angle q measured by the encoder 16 in accordance with the following equation (9) of motion for the pneumatic artificial muscle drive mechanism 101.

$$(F_a \cos q - F_b \cos q)r = I\ddot{q} \quad (9)$$

In this equation, symbol $F_a$ indicates contractive force of the pneumatic artificial muscle 6a, and symbol $F_b$ indicates contractive force of the pneumatic artificial muscle 6b.

$$F_a = F_l + \frac{I\ddot{q}}{2r\cos q} \quad (10)$$

$$F_b = F_l - \frac{I\ddot{q}}{2r\cos q} \quad (11)$$

The pneumatic artificial muscle model error estimator 103 utilizes the estimated value of the contraction percentage $\epsilon$ for the following pneumatic artificial muscle model built in an idea similar to that in the equations (6) and (7). In the following equation, symbols $b_0$, $b_1$, $b_2$, and $b_3$ indicate coefficients.

$$\varepsilon(P_i, f) = b_0(P_i) + b_1(P_i)f + b_2(P_i)f^2 + b_3(P_i)f^3 \quad (12)$$

$$\varepsilon(P, f) = \frac{(P_{i+1} - P)\varepsilon(P_i, f) + (P - P_i)\varepsilon(P_{i+1}, f)}{P_{i+1} - P_i} \quad (13)$$

When the pneumatic artificial muscle model error estimator 103 estimates contraction percentage of the pneumatic artificial muscle 6a, estimated contraction percentage $\epsilon_{est}$ is expressed as $\epsilon(P, F_a)$ that is obtained by substituting $F_a$ calculated in accordance with the equation (10) for f in the equations (12) and (13).

The pneumatic artificial muscle model error estimator 103 calculates a temporal average value $\Delta\epsilon = \text{Average}(\epsilon_{est} - \epsilon)$ as a difference between the estimated contraction percentage $\epsilon_{est}$ and the contraction percentage $\epsilon$, which have been calculated above. The temporal average value $\Delta\epsilon$ is defined as an error in the pneumatic artificial muscle model.

Figure 8:
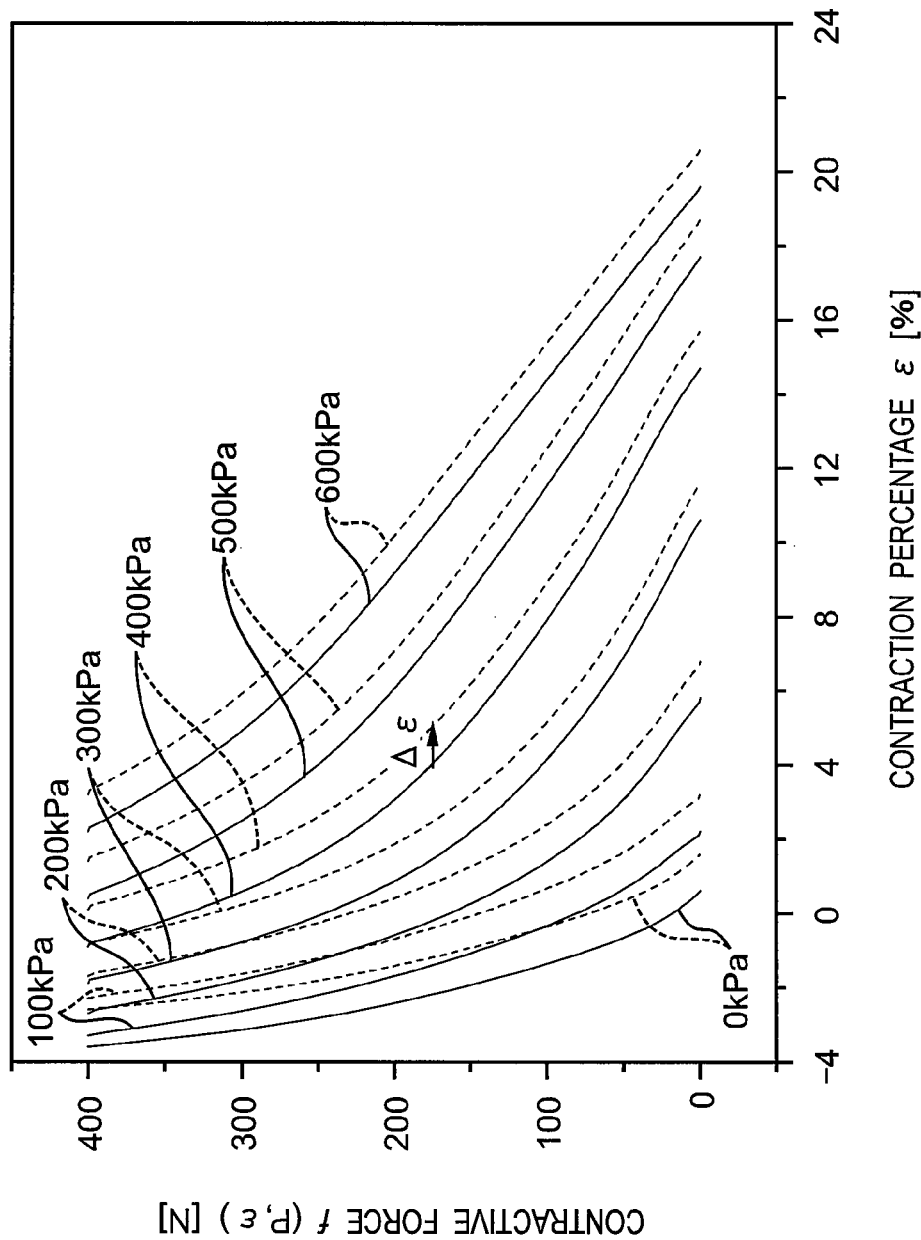
FIG. 8 is a graph indicating aging variation of the pneumatic artificial muscle model.

The processing described above corresponds to first-order approximation with use of a model that parallelly shifts aging variation of the pneumatic artificial muscles 6a and 6b from solid lines to dotted lines in FIG. 8.

There is provided a pneumatic artificial muscle model database (pneumatic artificial muscle model storage unit) 204 that stores the pneumatic artificial muscle models expressed by the equations (6) and (7) and the equations (12) and (13), respectively.

There is provided the pneumatic artificial muscle model updater 106 that updates the pneumatic artificial muscle model expressed by the equation (7) to f(P, $\epsilon+\Delta\epsilon$) and the pneumatic artificial muscle model expressed by the equation (13) to $\epsilon$(P, f)+$\Delta\epsilon$, respectively. Accordingly, compensated is variation in property such that the pneumatic artificial muscle is varied in the contract direction due to aging variation (in other words, updated such that property values of the pneumatic artificial muscle model are parallelly shifted by the amount of aging variation in the contraction percentage error estimated by the pneumatic artificial muscle model error estimator 103). As a result, control accuracy is improved.

There is provided the lifetime predictor 108 for determining that the pneumatic artificial muscle will be shortly damaged if a contraction estimated value $\Delta\epsilon$ of the pneumatic artificial muscle varies from an increasing trend to a decreasing trend, in other words, the state is changed from $d\Delta\epsilon/dt>0$ to $d\Delta\epsilon/dt<0$. In this case, the lifetime predictor 108 commands a lifetime alarm (lifetime alarm unit) 302 to issue an alarm and commands the desired joint angle generator 301 to stop updating the desired joint angle. The lifetime predictor 108 further commands the pressure error compensator 105 to exhaust air in each of the pneumatic artificial muscles 6a and 6b, and stops the operation of the pressure error compensator 105 so as to immediately stop the operation of the pneumatic artificial muscle drive mechanism 101. The pneumatic artificial muscles 6a and 6b can be safely stopped before being damaged due to aging variation.

The lifetime predictor 108 can judge lifetime in an alternative manner. A threshold value $\Delta\epsilon_{limit}$ is set preliminarily, and then the lifetime predictor 108 can judge damage will occur shortly if $\Delta\epsilon$ exceeds the threshold value $\Delta\epsilon_{limit}$.

The lifetime alarm 302 can issue an alarm by, for example, generating alerting sound with use of a dedicated speaker or a speaker built in the control computer, or lighting or blinking an alarm lamp installed.

After the issue of the alarm, instead of being immediately stopped on site, the drive mechanism can retreat to a predetermined primary position and stop subsequently, or can be reduced in speed.

Figure 4:
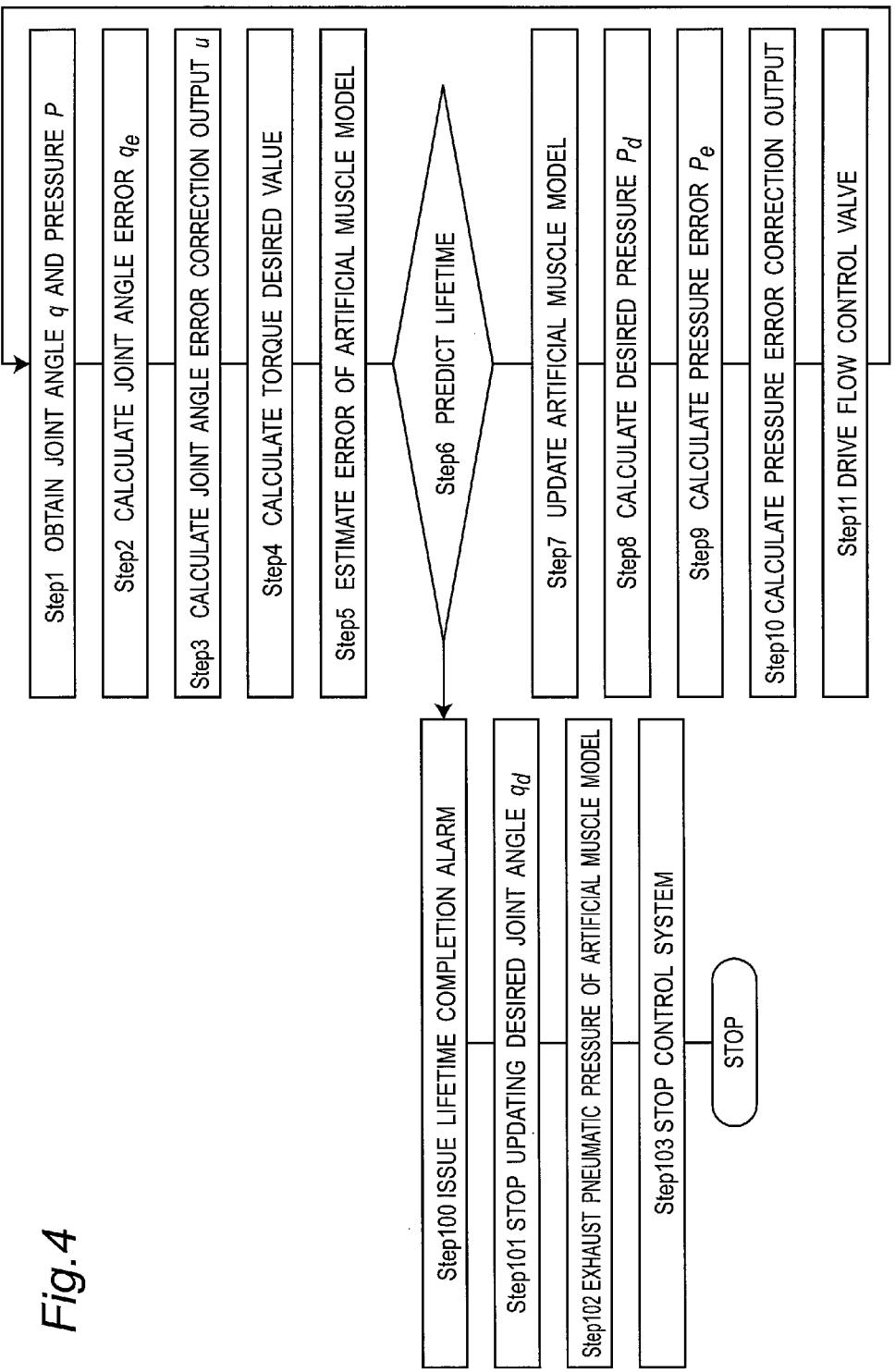
FIG. 4 is a flowchart of the calculation step of the control apparatus according to the first embodiment of the present invention.

Actual calculation steps of the control program in accordance with the above principle are described next with reference to the flowchart in FIG. 4.

In step 1, the control apparatus acquires joint angle data (the joint angle q) measured by the encoder 16 and the pressure P measured by the pressure sensor 11.

Then, in step 2, the first operation unit 100 calculates a joint angle error $q_e$ as a difference between the joint angle desired value $q_d$ transmitted from the desired joint angle generator 301 and the current joint angle q.

Then, in step 3, the joint angle error compensator 102 calculates a joint angle error correction output value from the joint angle error $q_e$ (processing at the joint angle error compensator 102). Specific examples of the joint angle error compensator 102 can include a PID compensator. In the case of the PID compensator, in step 3, the joint angle error correction output value u is obtained by summing three values, namely, a value obtained by multiplying the joint angle error $q_e$ by a proportional gain, a value obtained by multiplying a derivative value of the joint angle error $q_e$ by a derivative gain, and a value obtained by multiplying an integrate value of the joint angle error $q_e$ by an integral gain. The three constant gains, namely, the proportional gain, the derivative gain, and the integral gain are adjusted appropriately to achieve control such that the joint angle error converges to zero.

Then, in step 4, the inverse dynamics calculator 107 calculates a desired torque $\tau_d$ in accordance with the equation of motion for the pneumatic artificial muscle drive mechanism 101 (processing at the inverse dynamics calculator 107).

Then, in step 5, the pneumatic artificial muscle model error estimator 103 estimates an artificial muscle model error (processing at the pneumatic artificial muscle model error estimator 103).

Then, in step 6, the lifetime predictor 108 determines whether or not the lifetime of the pneumatic artificial muscle will terminate soon on the basis of the estimated model error. If the lifetime predictor 108 determines that the lifetime of the pneumatic artificial muscle will terminate soon, the procedure proceeds to stop processing in and after step 100. In this case, the lifetime predictor 108 transmits an alarm issue signal to the lifetime alarm 302, transmits a motion stop signal to the desired joint angle generator 301, and transmits an air exhaust signal to the pressure error compensator 105. If the lifetime predictor 108 determines that the lifetime of the pneumatic artificial muscle will not terminate soon, the procedure proceeds to step 7.

In step 100, in accordance with the alarm issue signal from the lifetime predictor 108, the lifetime alarm 302 issues a lifetime completion alarm.

Then, in step 101, in accordance with the motion stop signal from the lifetime predictor 108, the desired joint angle generator 301 stops update of the desired joint angle $q_d$ and transmits a pneumatic pressure exhaust command to the desired pressure calculator 104.

Then, in step 102, the desired pressure calculator 104 sets a desired pressure to $P_d=[0, 0]^T$, so as to exhaust air in each of the pneumatic artificial muscles 6a and 6b to reduce the pneumatic pressure therein to zero.

Then, in step 103, in accordance with the control stop signal from the desired pressure calculator 104, the pressure error compensator 105 stops its operation, and the stop processing is completed.

On the other hand, in step 7, the pneumatic artificial muscle model updater 106 updates the pneumatic artificial muscle model in accordance with the model error estimated by the pneumatic artificial muscle model updater 106 in step 5 (processing at the pneumatic artificial muscle model updater 106). The pneumatic artificial muscle model updater 106, which operates independently from the lifetime predictor 108, repeats receiving a contraction estimated value $\Delta\epsilon$ of the pneumatic artificial muscle and updating the artificial muscle model in its turn.

Then, in step 8, on the basis of the pneumatic artificial muscle model updated by the pneumatic artificial muscle model updater 106, the desired pressure calculator 104 calculates desired pressures Pd (processing at the desired pressure calculator 104).

Then, in step 9, the second operation unit 109 subtracts the current pressures P from the desired pressures $P_d$ calculated by the desired pressure calculator 104 so as to obtain pressure errors $P_e$.

Then, in step 10, the pressure error compensator 105 calculates pressure error correction output values from the pressure errors $P_e$ (processing at the pressure error compensator 105). Examples of the pressure error compensator 105 can include a PID compensator.

Then, in step 11, the pressure error correction output values calculated by the pressure error compensator 105 are transmitted to the three-port flow control solenoid valves 14a and 14b by way of the D/A board 15a, and the three-port flow control solenoid valves 14a and 14b vary the pressures in the pneumatic artificial muscles 6a and 6b, respectively, so that the rotary joint 3 in the pneumatic artificial muscle drive mechanism 101 starts rotation.

As having been described, in the control apparatus for the pneumatic artificial muscle drive mechanism 101 according to the first embodiment of the present invention, the pneumatic artificial muscle model error estimator 103 estimates contraction of the pneumatic artificial muscles 6a and 6b due to aging variation, and the pneumatic artificial muscle model updater 106 updates the pneumatic artificial muscle model, so that the aging variation is reflected in the pneumatic artificial muscle model to improve accuracy of the model.

It is difficult for the control system to estimate an error of a property model due to strong nonlinearity property of the pneumatic artificial muscles 6a and 6b as indicated in FIG. 5. However, the pneumatic artificial muscle model error estimator 103 is capable of approximate estimation by focusing only on the phenomenon of contraction dominantly observed in aging variation.

The lifetime predictor 108 monitors the contraction trend and detects variation from an increasing trend to a decreasing trend so as to be capable of predicting damage on the pneumatic artificial muscles 6a and 6b.

These effective features realize the safe control apparatus for the pneumatic artificial muscle drive mechanism 101, by which deterioration in control accuracy due to aging variation decreases even after use for a long period of time and the pneumatic artificial muscles 6a and 6b are made to stop before being damaged because of the lifetimes thereof.

Figure 12:
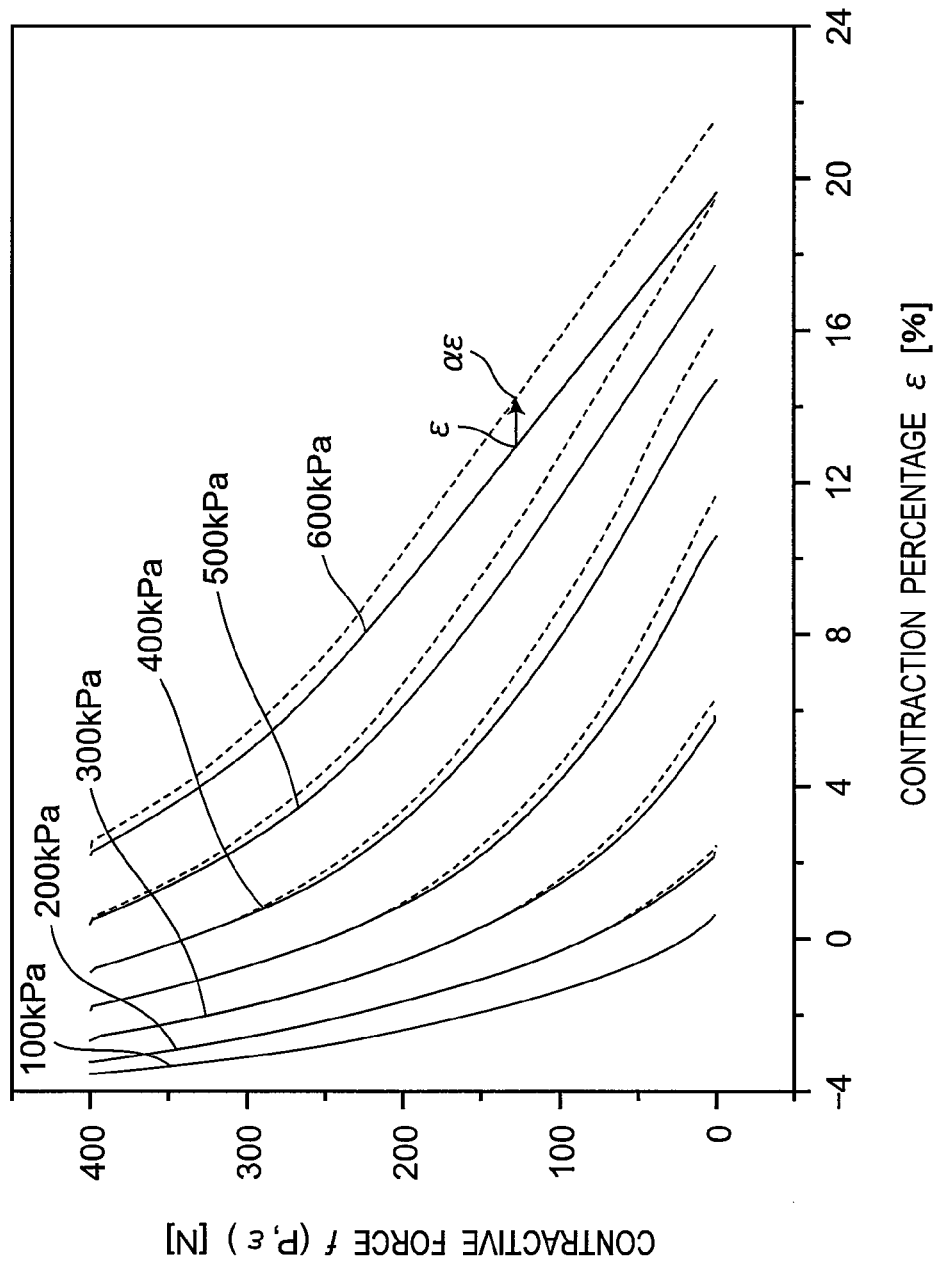
FIG. 12 is a graph indicating aging variation of a pneumatic artificial muscle model different from that of FIG. 8.

In the first embodiment, as indicated in FIG. 8, first-order approximation is applied with use of the model that parallelly shifts due to aging variation in the pneumatic artificial muscle. The present invention is, however, not limited to such a case. For example, as indicated in FIG. 12, it may be possible to apply a linear transformation method in which, assuming that a coefficient $\alpha=\text{Average}(\epsilon_{est}/\epsilon)$ if $\epsilon>0$ is established and the coefficient $\alpha=1$ if $\epsilon\leq0$ is established, the pneumatic artificial muscle model expressed by the equation (7) is updated to $f(P, \alpha\epsilon)$ and the pneumatic artificial muscle model expressed by the equation (13) is updated to $\alpha\epsilon(P, f)$. In this case, as properties of the pneumatic artificial muscle, the contractive force f has a large change rate in the region where the contraction percentage $\epsilon$ of the pneumatic artificial muscle is small. Accordingly, a slight error in the contraction percentage $\epsilon$ tends to cause a large error in contractive force. To the contrary, the present embodiment adopts the approximation method in which the variation amount of the model is reduced in the region where the contraction percentage $\epsilon$ is small. It is thus possible to suppress an error particularly in the region where the contraction percentage $\epsilon$ is small.

Alternatively, it is possible to combine parallel shift and linear transformation. When $\Delta\epsilon=\text{Average}(\epsilon_{est}-\epsilon)$, assuming that the coefficient $\alpha=\text{Average}(\epsilon_{est}/\epsilon)$ if $\epsilon>0$ is established and the coefficient $\alpha=1$ if $\epsilon\leq0$ is established, the pneumatic artificial muscle model expressed by the equation (7) is updated to $f(P, \alpha\epsilon+\Delta\epsilon)$ and the pneumatic artificial muscle model expressed by the equation (13) is updated to $\alpha\epsilon(P, f)+\Delta\epsilon$. This method corresponds to affine transformation.

Furthermore, when $\Delta\epsilon=\text{Average}(\epsilon_{est}-\epsilon)$, assuming that the coefficient $\alpha=\text{Average}(\epsilon_{est}/\epsilon)$ and a coefficient $\beta=\text{Average}(\epsilon_{est}^2/\epsilon^2)$ if $\epsilon>0$ is established and the coefficient $\alpha=1$ and the coefficient $\beta=1$ if $\epsilon\leq0$ is established, the pneumatic artificial muscle model expressed by the equation (7) is updated to $f(P, \beta\epsilon^2+\alpha\epsilon+\Delta\epsilon)$, and the pneumatic artificial muscle model expressed by the equation (13) is updated to $\beta\epsilon^2(P, f)+\alpha\epsilon(P,$ f)+Δε. This method approximates the variation of the model in accordance with a polynomial (quadratic), thereby realizing approximation with a higher degree of accuracy.

Approximation in any one of these method adopts a simple equation and thus requires calculation of less complexity. Accordingly, the model can be updated in real time.

Second Embodiment

Figure 10:
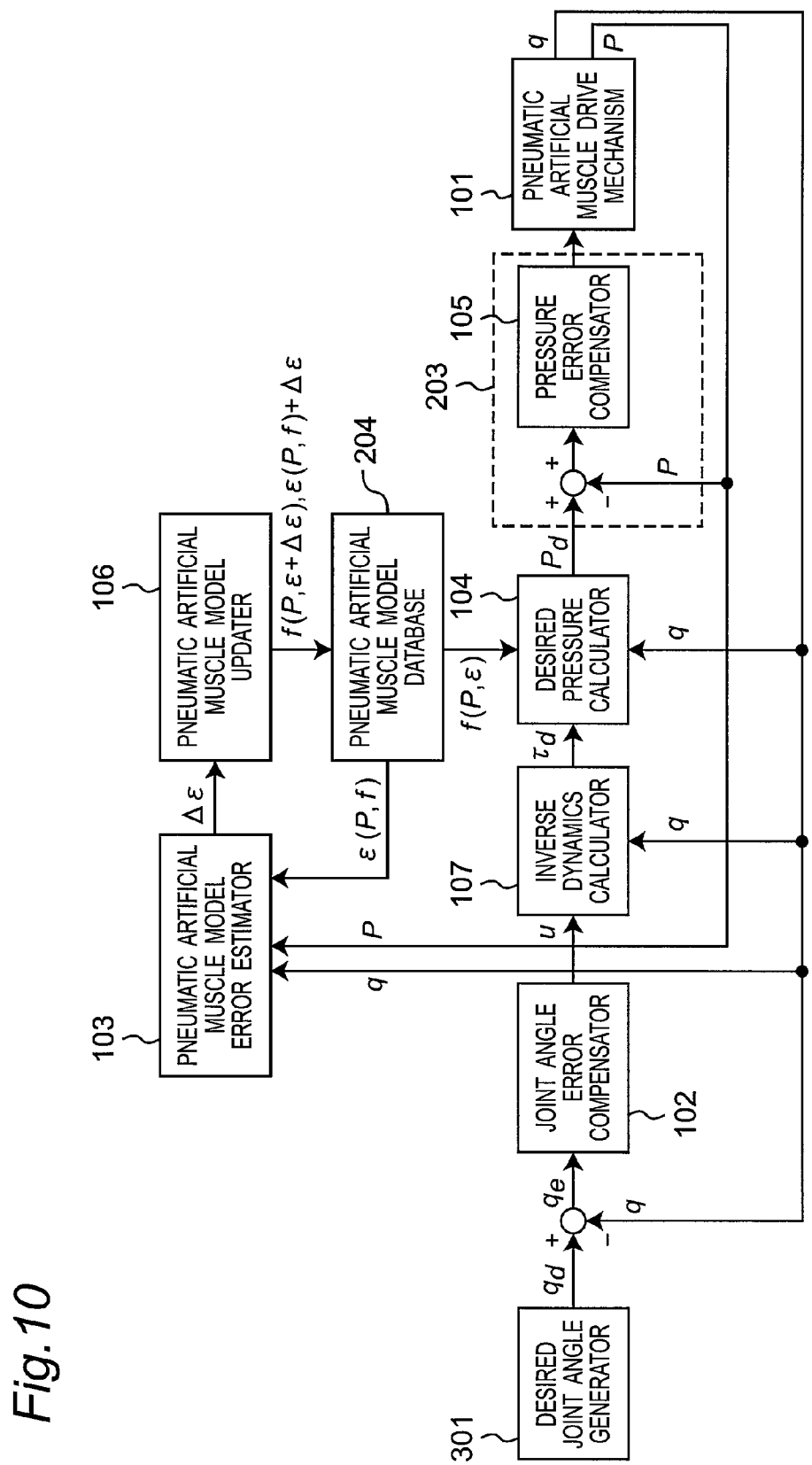
FIG. 10 is a block diagram showing a configuration of a control apparatus for a pneumatic artificial muscle drive mechanism according to a second embodiment of the present invention.

FIG. 10 shows a configuration of a control apparatus for a pneumatic artificial muscle drive mechanism 101 according to the second embodiment of the present invention. The second embodiment is similar to the first embodiment except that the lifetime predictor 108 is not provided in the second embodiment. The components in common are thus denoted by the reference signs same as those in the first embodiment and will not be detailed repeatedly.

It is possible to build a control system even in such a configuration, as shown in FIG. 10, not including the lifetime predictor 108, and such a control system functions as the control apparatus for the pneumatic artificial muscle drive mechanism 101. In this case, in step 5 of FIG. 4, the pneumatic artificial muscle model error estimator 103 estimates contraction of the pneumatic artificial muscles 6a and 6b due to aging variation as a model error. Thereafter, without predicting a lifetime by the lifetime predictor 108 in step 6 of FIG. 4, in step 7, on the basis of the contraction of the pneumatic artificial muscles 6a and 6b estimated by the pneumatic artificial muscle model error estimator 103 as the model error, the pneumatic artificial muscle model updater 106 updates the pneumatic artificial muscle model. Then, the procedure follows steps 8 to 11. Such a configuration enables aging variation to be reflected in the pneumatic artificial muscle model and thus improves accuracy of the model. As a result, the control system can suppress deterioration in control accuracy due to aging variation even after use for a long period of time. It is noted that the procedure according to the second embodiment does not follow steps 100 to 103 of FIG. 4.

Third Embodiment

Figure 11:
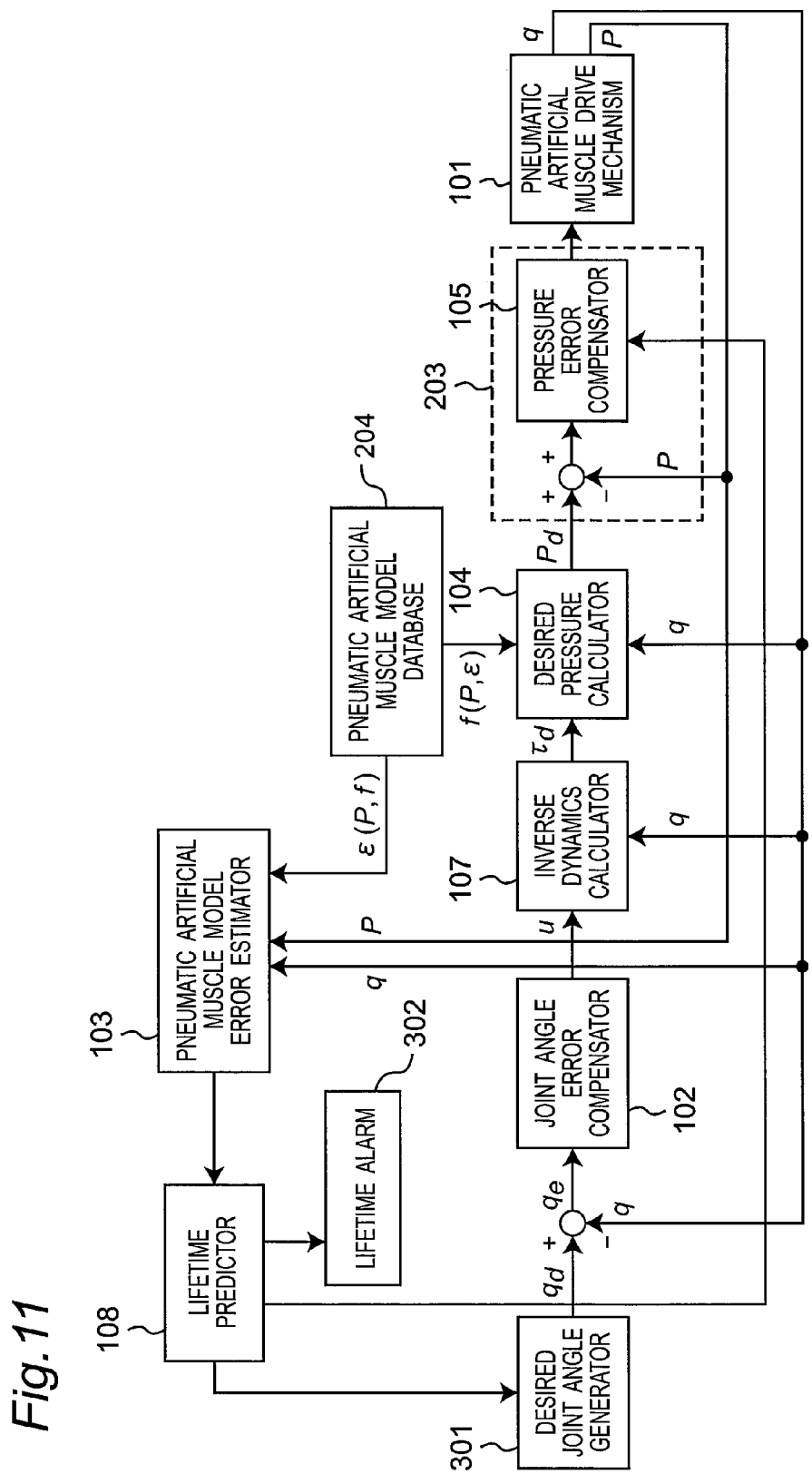
FIG. 11 is a block diagram showing a configuration of a control apparatus for a pneumatic artificial muscle drive mechanism according to a third embodiment of the present invention.

FIG. 11 shows a configuration of a control apparatus for a pneumatic artificial muscle drive mechanism 101 according to the third embodiment of the present invention. The third embodiment is similar to the first embodiment except that the pneumatic artificial muscle model updater 106 is not provided in the third embodiment. The components in common are thus denoted by the reference signs same as those in the first embodiment and will not be detailed repeatedly.

It is possible to build a control system even in such a configuration, as shown in FIG. 10, not including the pneumatic artificial muscle model updater 106, and such a control system functions as the control apparatus for the pneumatic artificial muscle drive mechanism 101. In this case, in step 5 of FIG. 4, the pneumatic artificial muscle model error estimator 103 estimates contraction of the pneumatic artificial muscles 6a and 6b due to aging variation as a model error. Then, in step 6, the lifetime predictor 108 monitors a contraction trend, and the procedure follows steps 100 to 103 upon detection of variation from an increase trend to a decreasing trend. Such a configuration enables prediction of damage on the pneumatic artificial muscles 6a and 6b, thereby realizing the safe control apparatus for the pneumatic artificial muscle drive mechanism 101. It is noted that the procedure according to the third embodiment does not follow steps 7 to 11 of FIG. 4.

Though the present disclosure has been described above based on the above first to third embodiments and the modification examples therefrom, the present disclosure should not be limited to the above-described first to third embodiments and the modification examples. For example, the present invention also includes the following cases.

Part or entirety of each of the above-described control apparatuses is actually a computer system that includes, for example, a microprocessor, ROM, RAM, hard disk unit, display unit, keyboard, mouse, and the like. A computer program is stored on the RAM or the hard disk unit. Functions of each of the apparatuses can be achieved by the microprocessor operating according to the computer program. The computer program mentioned here is a combination of a plurality of instruction codes that indicate commands to a computer for achieving predetermined functions.

For example, each component can be implemented as a result that a program executing part such as a CPU reads and executes software programs recorded in a recording medium such as a hard disk or semiconductor memory. Here, software that partially or entirely implements the control apparatus according to each of the above-mentioned embodiments or modification examples is a following program.

This program corresponds to a control program for a pneumatic artificial muscle drive mechanism driven by a pneumatic artificial muscle, the control program causing a computer to function as:

a desired pressure calculator that calculates, based on a pneumatic artificial muscle model, a desired pressure of the pneumatic artificial muscle in order to control motion of the drive mechanism;

a pneumatic artificial muscle model error estimator that estimates aging variation in a contraction percentage error between the pneumatic artificial muscle and the pneumatic artificial muscle model;

a pressure controller that controls pressure of the pneumatic artificial muscle based on information from the desired pressure calculator or information from the pneumatic artificial muscle model error estimator; and a pneumatic artificial muscle model updater that updates the pneumatic artificial muscle model so as to reflect the aging variation based on an estimation result of the pneumatic artificial muscle model error estimator.

Alternatively, the program corresponds to a control program for a pneumatic artificial muscle drive mechanism driven by a pneumatic artificial muscle, the control program causing a computer to function as:

a desired pressure calculator that calculates, based on a pneumatic artificial muscle model, a desired pressure of the pneumatic artificial muscle in order to control motion of the drive mechanism;

a pneumatic artificial muscle model error estimator that estimates aging variation in a contraction percentage error between the pneumatic artificial muscle and the pneumatic artificial muscle model;

a pressure controller that controls pressure of the pneumatic artificial muscle based on information from the desired pressure calculator or information from the pneumatic artificial muscle model error estimator; and a lifetime predictor that predicts a lifetime of the pneumatic artificial muscle based on an estimation result of the pneumatic artificial muscle model error estimator.

In addition, it may be possible to execute each of the programs by downloading each of the programs from a server or reading each of the programs from a predetermined storage medium (an optical disc such as a CD-ROM, a magnetic disc, a semiconductor memory, or the like).

Further, one or more computers can be used to execute the program. That is, centralized processing or distributed processing can be performed.

It is noted that any of the above various embodiments and the modification examples therefrom can be combined together appropriately so as to exert the respective effects thereof.

The control apparatus, the control method, and the control program for the pneumatic artificial muscle drive mechanism according to the present invention are useful as a control apparatus, a control method, and a control program for a system including a joint mechanism such as a robot arm for supporting work while coexisting with a human being in a plant or a home.

The entire disclosure of Japanese Patent Application No. 2011-176931 filed on Aug. 12, 2011, including specification, claims, drawings, and summary are incorporated herein by reference in its entirety.

Although the present disclosure has been fully described in connection with the embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A control apparatus for a pneumatic artificial muscle drive mechanism driven by a pneumatic artificial muscle, the control apparatus comprising:
a desired pressure calculator that calculates, based on a pneumatic artificial muscle model, a desired pressure of the pneumatic artificial muscle in order to control motion of the drive mechanism;
a pneumatic artificial muscle model error estimator that estimates aging variation in a contraction percentage error between the pneumatic artificial muscle and the pneumatic artificial muscle model;
a pressure controller that controls pressure of the pneumatic artificial muscle based on information from the desired pressure calculator or information from the pneumatic artificial muscle model error estimator; and
a pneumatic artificial muscle model updater that updates the pneumatic artificial muscle model so as to reflect the aging variation based on an estimation result of the pneumatic artificial muscle model error estimator.

2. The control apparatus for the pneumatic artificial muscle drive mechanism according to claim 1, further comprising a lifetime predictor that predicts a lifetime of the pneumatic artificial muscle based on the estimation result of the pneumatic artificial muscle model error estimator.

3. The control apparatus for the pneumatic artificial muscle drive mechanism according to claim 2, further comprising:
a lifetime alarm that outputs a damage alarm for the pneumatic artificial muscle;
wherein the lifetime predictor causes the lifetime alarm to output the damage alarm for the pneumatic artificial muscle after aging variation in the contraction percentage error of the pneumatic artificial muscle changes from an increasing trend to a decreasing trend.

4. The control apparatus for the pneumatic artificial muscle drive mechanism according to claim 2, further comprising:
a lifetime alarm that outputs a damage alarm for the pneumatic artificial muscle;
wherein the lifetime predictor causes the lifetime alarm to output the damage alarm for the pneumatic artificial muscle when an aging variation amount of the contraction percentage error exceeds a limit contraction percentage error of the pneumatic artificial muscle set in correspondence with application of a force applied on the pneumatic artificial muscle.

5. The control apparatus for the pneumatic artificial muscle drive mechanism according to claim 1, wherein the pneumatic artificial muscle model updater updates such that a property value of the pneumatic artificial muscle model parallelly shifts by an aging variation amount of the contraction percentage error estimated by the pneumatic artificial muscle model error estimator.

6. The control apparatus for the pneumatic artificial muscle drive mechanism according to claim 1, wherein the pneumatic artificial muscle model updater updates such that a property value of the pneumatic artificial muscle model linearly transforms by an aging variation amount of the contraction percentage error estimated by the pneumatic artificial muscle model error estimator.

7. The control apparatus for the pneumatic artificial muscle drive mechanism according to claim 1, wherein the pneumatic artificial muscle model updater updates such that a property value of the pneumatic artificial muscle model affine-transforms by an aging variation amount of the contraction percentage error estimated by the pneumatic artificial muscle model error estimator.

8. The control apparatus for the pneumatic artificial muscle drive mechanism according to claim 1, wherein the pneumatic artificial muscle model updater updates such that a property value of the pneumatic artificial muscle model transforms in accordance with a polynomial by an aging variation amount of the contraction percentage error estimated by the pneumatic artificial muscle model error estimator.

9. A method of controlling a pneumatic artificial muscle drive mechanism driven by a pneumatic artificial muscle, the method comprising:
calculating at a desired pressure calculator, based on a pneumatic artificial muscle model, a desired pressure of the pneumatic artificial muscle in order to control motion of the drive mechanism;
estimating at a pneumatic artificial muscle model error estimator, aging variation in a contraction percentage error between the pneumatic artificial muscle and the pneumatic artificial muscle model;
controlling at a pressure controller, pressure of the pneumatic artificial muscle based on information from the desired pressure calculator or information from the pneumatic artificial muscle model error estimator; and
updating at a pneumatic artificial muscle model updater, the pneumatic artificial muscle model so as to reflect the aging variation based on an estimation result of the pneumatic artificial muscle model error estimator.

10. The method of controlling the pneumatic artificial muscle drive mechanism according to claim 9, further comprising: predicting at a lifetime predictor, a lifetime of the pneumatic artificial muscle based on the estimation result of the pneumatic artificial muscle model error estimator.

11. A computer-readable recording medium including a control program for a pneumatic artificial muscle drive mechanism driven by a pneumatic artificial muscle,
the control program causing a computer to function as:
a desired pressure calculator that calculates, based on a pneumatic artificial muscle model, a desired pressure of the pneumatic artificial muscle in order to control motion of the drive mechanism;
a pneumatic artificial muscle model error estimator that estimates aging variation in a contraction percentage error between the pneumatic artificial muscle and the pneumatic artificial muscle model;

a pressure controller that controls pressure of the pneumatic artificial muscle based on information from the desired pressure calculator or information from the pneumatic artificial muscle model error estimator; and a pneumatic artificial muscle model updater that updates the pneumatic artificial muscle model so as to reflect the aging variation based on an estimation result of the pneumatic artificial muscle model error estimator.

* * * * *